US012687425B2

(12) United States Patent
Wakisaka et al.

(10) Patent No.: US 12,687,425 B2
(45) Date of Patent: Jul. 21, 2026

(54) VIBRATION MEASURING INSTRUMENT AND VIBRATION MEASUREMENT METHOD

(71) Applicant: NTT, Inc., Tokyo (JP)

(72) Inventors: Yoshifumi Wakisaka, Musashino (JP); Daisuke Iida, Musashino (JP); Yusuke Koshikiya, Musashino (JP); Hiroyuki Iida, Musashino (JP); Nazuki Honda, Musashino (JP)

(73) Assignee: NTT, Inc., Tokyo (JP)

( * ) Notice: Subject to any disclaimer, the term of this patent is extended or adjusted under 35 U.S.C. 154(b) by 309 days.

(21) Appl. No.: 18/567,606

(22) PCT Filed: Jun. 9, 2021

(86) PCT No.: PCT/JP2021/021991
§ 371 (c)(1),
(2) Date: Dec. 6, 2023

(87) PCT Pub. No.: WO2022/259437
PCT Pub. Date: Dec. 15, 2022

(65) Prior Publication Data
US 2024/0280403 A1 Aug. 22, 2024

(51) Int. Cl.
*G01H 9/00* (2006.01)
*G01D 5/353* (2006.01)

(52) U.S. Cl.
CPC ......... *G01H 9/004* (2013.01); *G01D 5/35358* (2013.01)

(58) Field of Classification Search
CPC .......................... G01H 9/004; G01D 5/35358
See application file for complete search history.

(56) References Cited

U.S. PATENT DOCUMENTS 11,320,302 B2 *   5/2022   Cedilnik ............ G01D 5/35361
2022/0260394 A1 *   8/2022   Hua ..................... G01M 7/025
2023/0175884 A1     6/2023   Wakisaka et al.

FOREIGN PATENT DOCUMENTS

CN        107515019 A  * 12/2017   ........ G01D 5/35306
CN        113483790 B  *  1/2025   ........ G01D 5/35361
JP        2014157134 A     8/2014
WO    WO-2021075015 A1  *  4/2021   ............ G01H 9/004

OTHER PUBLICATIONS

Ali. Masoudi, T. P. Newson, "Contributed Review: Distributed optical fibre dynamic strain sensing", Review of Scientific Instruments, vol. 87, pp. 011501 (2016).

(Continued)

*Primary Examiner* — Thomas M Hammond, III
(74) *Attorney, Agent, or Firm* — Harness, Dickey & Pierce, PLC

(57) ABSTRACT

The present disclosure relates to a vibration measuring instrument that repeatedly injects a plurality of light pulses with different optical frequencies into an optical fiber, and performs distributed acoustic sensing-phase (DAS-P). In the vibration measuring instrument, light pulses having a waveform with a spectral side lobe smaller than a side lobe of a rectangular wave are used as the plurality of light pulses.

7 Claims, 8 Drawing Sheets

(56)                 References Cited

OTHER PUBLICATIONS

Ken'ichi Nishiguchi, Li Che-Hsien, Artur Guzik, Mitsunori Yokoyama, Kinzo Kishida, "Fabrication of Fiber-Optic Distributed Acoustic Sensor and Its Signal Processing", IEICE Technical Report, 115(202), pp. 29-34 (2015) with machine generated English translation thereof.

G. Yang et al., "Long-Range Distributed Vibration Sensing Based on Phase Extraction from Phase-Sensitive OTDR", IEEE Photonics Journal, vol. 8, No. 3, 2016.

D. Iida, K. Toge, T. Manabe, "Distributed measurement of acoustic vibration location with frequency multiplexed phase-OTDR", Opt. Fiber Technol., 2017, 36, pp. 19-25, DOI: 10.1016/j.yofte.2017.02.005.

Y. Wakisaka, D. Iida and H. Oshida, "Distortion-Suppressed Sampling Rate Enhancement in Phase-OTDR Vibration Sensing with Newly Designed FDM Pulse Sequence for Correctly Monitoring Various Waveforms", 2020 Optical Fiber Communications Conference and Exhibition (OFC), San Diego, CA, USA, 2020, pp. 1-3.

Maria Rosario Fernandez-Ruiz, Hugo F. Martins, "Steady-Sensitivity Distributed Acoustic Sensors", J. Lightwave Technol. 36, 5690-5696 (2018).

C. D. Butter and G. B. Hocker, "Fiber optics strain gauge", Appl. Opt. 17, 2867-2869 (1978).

A. E. Alekseev et al., "Fidelity of the dual-pulse phase-OTDR response to spatially distributed external perturbation", Laser Phys. 29 055106 (2019).

Yang Guangyao et al: "Frequency Response Enhancement of Direct-Detection Phase-Sensitive OTDR by Using Frequency Division Multiplexing" 2018.

* cited by examiner

[4]

CROSSTALK COMPONENT 403

VIBRATION MEASURING INSTRUMENT AND VIBRATION MEASUREMENT METHOD

CROSS-REFERENCE TO RELATED APPLICATIONS

This application is a 371 U.S. National Phase of International Application No. PCT/JP2021/021991, filed on Jun. 9, 2021. The entire disclosure of the above application is incorporated herein by reference.

TECHNICAL FIELD

The present disclosure relates to a vibration measuring instrument and a vibration measuring method for performing DAS-P.

BACKGROUND ART

As a means for measuring physical vibration, applied to an optical fiber, in a distributed manner in a longitudinal direction of the optical fiber, there is a known method called distributed acoustic sensing (DAS) by which pulsed test light is injected into a measurement target optical fiber and backscattered light resulting from Rayleigh scattering is detected (Non Patent Literature 1).

In DAS, vibration sensing is performed by capturing changes, in the optical path length of an optical fiber, resulting from physical vibration applied to the optical fiber. By detecting vibration, it is possible to detect movement or the like of an object around the measurement target optical fiber.

As a method for detecting backscattered light in DAS, there is a technique for measuring the intensity of light scattered from each point on the measurement target optical fiber, and observing temporal changes in the intensity of the scattered light. This technique is called DAS-intensity (DAS-I). Although DAS-I characteristically simplifies the device configuration, it is impossible to quantitatively calculate a change in the optical path length of a fiber, resulting from vibration, on the basis of the scattered light intensity, and therefore, DAS-I is a qualitative measurement method (Non Patent Literature 2).

On the other hand, DAS-phase (DAS-P), which is a technique for measuring the phase of light scattered from each point on the measurement target optical fiber and observing temporal changes in the phase, has also been researched and developed. Although the device configuration and the signal processing in DAS-P are more complicated than those in DAS-I, a phase changes linearly with respect to changes, in the optical path length of a fiber, resulting from vibration, and the rate of change is also uniform in the longitudinal direction of the optical fiber. Thus, vibration can be quantitatively measured, and the vibration applied to the measurement target optical fiber can be faithfully reproduced (Non Patent Literature 2, for example).

In measurement by DAS-P, pulsed light is injected into the measurement target optical fiber, and the phase of scattered light at a time t for injecting the pulsed light is measured, in a distributed manner, in the longitudinal direction of the optical fiber. That is, the phase $\theta(l, t)$ of the scattered light is measured, with the distance from the incidence end of the optical fiber set to a distance l. The pulsed light is repeatedly injected into the measurement target optical fiber at time intervals T, so that the temporal change $\theta(l, nT)$ in the phase of the scattered light at time t=nT (n being an integer) is measured at each point in the longitudinal direction of the measurement target optical fiber. In practice, however, the time for measuring at the point of the distance l is later than the time for injecting the pulse by the time during which the pulsed light propagates from the incidence end to the distance l. Further, it should be noted that the time at which a measuring instrument measures is delayed by the time required for the scattered light to return to the incidence end. It is known that the magnitude of physical vibration applied to the section from the distance l to a distance l+δl at each time nT is proportional to the difference $\delta\theta(l, nT)$ between the phase $\theta(l+\delta l, nT)$ at the distance l+δl and the phase $\theta(l, nT)$ at the distance l. That is, the expression shown below is satisfied when time zero is the reference time.

[Math. 1]

$$(\text{Magnitude of vibration}) \propto \delta\theta(l, nT) - \delta\theta(l, 0) \qquad (1)$$
$$= [\theta(l + \delta l, nT) - \theta(l, nT)] - [\theta(l + \delta l, 0) - \theta(l, 0)]$$
$$= [\theta(l + \delta l, nT) - \theta(l + \delta l, 0)] - [\theta(l, nT) - \theta(l, 0)]$$

As device configurations for detecting the phase of scattered light, there are a direct detection configuration that directly detects backscattered light from the measurement target optical fiber with a photodiode or the like, and a configuration that uses coherent detection to detect backscattered light multiplexed with separately prepared reference light (Non Patent Literature 1, for example).

Mechanisms for performing coherent detection and calculating a phase are specifically classified into two kinds, which are a mechanism for software-based processing using Hilbert transform, and a mechanism for hardware-based processing using a 90-degree optical hybrid. In both kinds of methods, an in-phase component I(l, nT) and a quadrature component Q(l, nT) of scattered light are acquired, and the phase is calculated according to the expression shown below.

[Math. 2]

$$\theta_{cal}(l, nT) = \text{Arctan}\left[\frac{Q(l, nT)}{I(l, nT)}\right] \qquad (2)$$

However, an output value by the four-quadrant arctangent operator Arctan is within the range of $(-\pi, \pi)$ in radians, and $2 m\pi + \theta(l, nT)$ all have the same vector direction in an x-y plane (m being an integer), and accordingly, the uncertainty of 2 mπ exists in $\theta_{cal}(l, nT)$ calculated as above. Therefore, as a more accurate evaluation method for $\theta(l, nT)$, signal processing such as phase unwrapping is further performed. Given that the phase after unwrapping is represented by $\theta_{cal}^{unwrap}$ in general phase unwrapping, when processing is performed in ascending order of time, for example, $\theta_{cal}^{unwrap}$ is set to be the same as $\theta_{cal}$ at the start point of the phase unwrapping, and $\theta_{cal}^{unwrap}(l, pT)$ to $\theta_{cal}^{unwrap}(l, (p+1) T)$ are then sequentially calculated as shown below, with p representing an integer.

On condition that $$|\theta_{cal}(l, (p + 1)T) - \theta_{cal}^{unwrap}(l, pT)| \qquad [\text{Math. 2-1}]$$

is more than the $\pi$ radian, an appropriate integer q is selected so that $$|\theta_{cal}(l, (p + 1)T) + 2\pi q - \theta_{cal}^{unwrap}(l, pT)| \qquad \text{[Math. 2-2]}$$

is equal to or smaller than the $\pi$ radian, and the phase $\theta_{cal}^{unwrap}$ (l, (p+1) T) after the unwrapping is sequentially calculated as follows.

[Math. 3]

$$\theta_{cal}^{unwrap}(l, (p + 1)T) = \theta_{cal}(l, (p + 1)T) + 2\pi q \qquad (3)$$

The superscript "unwrap" indicates a phase after unwrapping. Note that, as the calculation procedures in actual distributed vibration measurement, a phase unwrapping process is often performed on a difference, calculated in advance, in phase value between points as in Expression (1).

In measurement by DAS, there is noise of the measuring instrument, such as thermal noise of a photodiode (PD) for detecting light, noise at the subsequent electrical stage, or shot noise caused by light. Therefore, the intensity and the phase of the scattered light to be measured are also affected by the noise of the measuring instrument.

In particular, when the phase of scattered light is measured, the large influence of noise of the measuring instrument increases not only the uncertainty of the phase, but also the probability of a measurement value being significantly different from the ideal phase value to be obtained in the absence of noise.

For example, as for the vector of measured scattered light in a system where the in-phase component is represented by the abscissa axis and the quadrature component is represented by the ordinate axis in coherent detection, the direction of the vector of no noise corresponds to the phase to be measured. However, when the influence of noise is large, the vector is directed in the opposite direction, which increases the probability that a difference between the phase value to be actually measured and the ideal phase value of no noise is about the radian. Such an aspect leads to erroneous recognition that a large physical force has been applied to the optical fiber, when the magnitude of vibration is calculated according to Expression (1). Also, when the influence of noise becomes large, the number of points at which the integer q is erroneously selected increases in the unwrapping process shown in Expression (3), and a phase value difference of $2\pi$ or larger, which is not actually present, appears between the front and rear of the point of the erroneous selection. Such a phase value difference also leads to erroneous recognition that a large physical force has been applied to the optical fiber, when the magnitude of vibration is calculated according to Expression (1).

To accurately measure the phase, it is necessary to reduce the influence of noise of the measuring instrument. The influence of noise of the measuring instrument is increased by decreasing the intensity of scattered light, as long as the noise of the measuring instrument can be regarded as the same level at each point and each time. Accordingly, increasing the intensity of scattered light at each point and each time can reduce the influence of noise of the measuring instrument.

The reason why the intensity of scattered light drops is not only the loss caused by the absorption and the scattering accompanying the propagation of pulsed light as a probe in the measurement target optical fiber. Since pulsed light having a finite duration is made to enter the measurement target optical fiber to detect scattering of the pulsed light, the scattered light is interfered with by a large number of scattered substances very finely distributed in the measurement target optical fiber. As a result of the interference, a point at which the intensity of the scattered light drops appears, depending on the distribution of the scattered substances in the longitudinal direction of the measurement target optical fiber at each time. This phenomenon is called fading (Non Patent Literature 3).

Therefore, when the phase of scattered light in DAS-P is measured, it is necessary to prevent the appearance of a point at which the intensity of scattered light drops at each time due to fading, as a result of reduction of the influence of noise of the measuring instrument.

As a means for solving the problem, there is a method for increasing the peak intensity of the light pulse to be simply injected. However, when the peak intensity of a light pulse is increased, a nonlinear effect occurs during propagation of the light pulse in the measurement target optical fiber, and the characteristics of the pulsed light change in response to the propagation in the measurement target optical fiber. Because of this, the peak intensity of the light pulse allowed to be injected is limited, and the above problem is not sufficiently solved in some cases.

To solve the above problem, there are a suggested phase measurement method and a suggested signal processing device capable of reducing the influence of noise of a measuring instrument without any increase in the peak intensity of the incident light pulse in measuring the phase of scattered light in DAS-P (Patent Literature 1).

According to Patent Literature 1, to solve the above problem, pulsed light, obtained by arraying and wavelength-multiplexing pulses with different optical frequency components at time intervals at which changes in the fiber state resulting from vibration are negligible, is injected into the measurement target optical fiber, scattered light vectors are created by plotting scattered light with the respective wavelengths from the measurement target optical fiber in a two-dimensional plane in which the in-phase components are represented by the abscissa axis and the quadrature components are represented by the ordinate axis, directions of the created scattered light vectors are matched by rotating the created scattered light vectors for each wavelength at each point on the measurement target optical fiber, a new vector is generated by averaging the vectors having the directions matched, and a phase is calculated from the values of the in-phase component and the quadrature component of the generated new vector.

In the measurement by DAS-P, there is also a problem of trade-off between the measurement distance and the measurable upper limit of the vibrational frequencies. When a light pulse of a single frequency is used, the long measurement distance delays the time at which scattered light returns from the far end, with respect to the pulse incident time. Therefore, there is the upper limit of the repetition frequency at which light pulses are injected so that the scattered light from the far end and the scattered light from the vicinity of the incidence end obtained by injecting the next light pulse are not multiplexed and do not interfere with each other. In view of this, from the sampling theorem, vibration of vibrational frequencies higher than the Nyquist frequency, which is ½ of the repetition frequency, cannot be correctly measured due to aliasing.

Non Patent Literature 4 has been suggested as a method for solving the above problem. According to Non Patent Literature 4, to solve the above problem, pulsed light obtained by arraying pulses with different optical frequency components at equal intervals and performing wavelength-multiplexing thereon is injected into the measurement target optical fiber, and scattered light with the respective wavelengths from the measurement target optical fiber is plotted in a two-dimensional plane in which the in-phase components are represented by the abscissa axis and the quadrature components are represented by the ordinate axis, to create scattered light vectors. The phase is calculated from the obtained scattered light vectors. Given that the sampling rate upper limit determined from the measurement distance on condition of a single optical frequency is represented by $f_s$, the sampling rate upper limit can be $N \times f_s$ by N-wave multiplexing. Note that the wavelength multiplexing number "N" is a natural number.

Here, in implementing the frequency multiplexing method disclosed in Non Patent Literature 4, when a phase change is calculated by simply combining the angles of the scattered light vectors obtained at the respective optical frequencies without correcting the angular difference between the respective optical frequencies, the calculated phase change is distorted compared with the actual phase change, and an accurate vibrational waveform cannot be measured. To counter this problem, Non Patent Literature 4 suggests a method for correctly estimating the frequency of a signal having a vibrational frequency exceeding the Nyquist frequency $f_v$ on condition of the single frequency, by first calculating the temporal phase difference of the respective optical frequencies and then combining the calculated phase differences of the respective optical frequencies. That is, it is possible to estimate frequencies up to the frequency $N \times f_v$ without aliasing. By this suggested technique, however, the angular differences between the respective optical frequencies are not obtained, and therefore, any vibrational waveform cannot be measured.

As a countermeasure for this problem, Non Patent Literature 5 suggests a measurement method capable of measuring a vibrational waveform under the condition that the sampling rate upper limit is increased to $N \times f_s$, by correcting the angular differences between the respective optical frequencies using a correction frequency. By the suggested method, a compensation optical frequency is used separately from the main optical frequencies to improve the sampling rate, and a probe pulse train is used so that a component regarding a main optical frequency and a component regarding the compensation optical frequency regularly are injected into the measurement target fiber at timings allowed to be regarded as the same times. Thus, the angular difference between the component regarding the main optical frequency and the component regarding the compensation optical frequency is corrected, and the angular differences between the respective main optical frequencies are corrected.

Further, in the trade-off between the measurement distance and the upper limit of the measurable vibrational frequencies, a more severe requirement is added, because phase unwrapping needs to be performed correctly. When the absolute value of the magnitude of the phase change, with adjacent light pulses subjected to sampling, changes by more than $\pi$, phase unwrapping cannot be uniquely performed, which leads to failed phase unwrapping (Non Patent Literature 6).

Therefore, there is a constraint that the upper limit of the absolute value of the magnitude of a phase change at adjacent sampling points is $\pi$. Even within the range of the Nyquist frequency or lower, as the vibrational frequency becomes higher, the phase change at adjacent sampling points becomes larger. Therefore, when the vibration amplitude becomes larger, a further requirement is added to the upper limit of the measurable vibrational frequencies. By the suggested method disclosed in Non Patent Literature 5, a vibrational waveform can be measured, and accordingly, this method is also effective in alleviating such constraints.

Non Patent Literature 5 also suggests an optical frequency pulse forming method and a reception signal processing method for simultaneously implementing a frequency multiplexing method by which pulses with different optical frequencies are injected at different times so as to improve the sampling rate, and the frequency multiplexing method disclosed in Patent Literature 1 as a countermeasure against fading.

Note that the relationship between the magnitude of a phase change and the amount of distortion applied to a fiber by vibration is explained in Non Patent Literature 7, for example. According to Non Patent Literature 7, when a fiber having an entire length $l$ is elongated by $\Delta l$ due to a distortion amount $\varepsilon$, the increase amount $\Delta \phi$ of the phase change resulting from the elongation by $\Delta l$ in light passing is shown in the expression below.

[Math. 4]

$$\Delta \varphi = \varepsilon l \left[ k - \frac{1}{2} k n^2 ((1 - \mu_p) p_{12} - \mu p_{11}) \right] \tag{4}$$

Here, $k = 2\pi n / \lambda$ represents the propagation constant, n represents the effective refractive index of the fiber, $\mu_p$ represents the Poisson's ratio, and $p_{11}$ and $p_{12}$ represent the strain-optic tensor components. For example, given $\lambda = 1555$ nm near a normal communication wavelength band, $n = 1.47$, $\mu_p = 0.17$, $p_{11} = 0.121$, and $p_{12} = 0.271$. Therefore, it is known that the following expression is satisfied (Non Patent Literature 8).

[Math. 5]

$$\Delta \varphi = K \varepsilon l \tag{5}$$

Here, $K = 4.6 \times 10^6 \text{ m}^{-1}$. Using this relational expression, it is possible to replace the requirement for the magnitude of a phase change with the requirement for a distortion amount.

According to Non Patent Literature 5, pulses with different optical frequencies are injected at different times, to improve the sampling rate. When a simple rectangular wave is used as a pulse outer shape, the band occupied by scattered light of each optical frequency component is in the shape of a sinc function, and therefore, side lobes are present. The side lobes cause crosstalk in which the bands, occupied by scattered light with the respective optical frequency components, overlap with each other. Due to this crosstalk, a component regarding a band near an optical frequency fm of the side lobes of scattered light with another optical frequency component fn that is injected at another time is added to the signal of scattered light of the optical frequency component fm, and both components cannot be separated by a digital bandpass filter or the like. These two components are added in a vector state in a plane in which the in-phase component of scattered light is represented by the abscissa axis, and the quadrature component is represented by the ordinate axis. Because the addition is performed in a vector state, erroneous detection of vibration occurs in a section withdrawn from the spot at which vibration has actually occurred. Further, a phenomenon in which the vibrational waveform at the vibration spot is distorted compared with the actual waveform occurs, and there also is a generated influence of hindrance to complete correction of the angular difference using a compensation optical frequency.

CITATION LIST

Patent Literature

Patent Literature 1: JP 2020-169904 A

Non Patent Literature

Non Patent Literature 1: Ali. Masoudi, T. P. Newson, "Contributed Review: Distributed optical fibre dynamic strain sensing." Review of Scientific Instruments, vol. 87, pp011501 (2016)

Non Patent Literature 2: Ken'ichi Nishiguchi, Li Che-Hsien, Artur Guzik, Mitsunori Yokoyama, Kinzo Kishida, "Fabrication of Fiber-Optic Distributed Acoustic Sensor and Its Signal Processing", IEICE Technical Report, 115 (202), pp29-34 (2015)

Non Patent Literature 3: G. Yang et al., "Long-Range Distributed Vibration Sensing Based on Phase Extraction from Phase-Sensitive OTDR," IEEE Photonics Journal, vol. 8, no. 3, 2016.

Non Patent Literature 4: D. Iida, K. Toge, T. Manabe, 'Distributed measurement of acoustic vibration location with frequency multiplexed phase-OTDR', Opt. Fiber Technol., 2017, 36, pp 19-25, DOI: 10.1016/j.yofte.2017.02.005

Non Patent Literature 5: Y. Wakisaka, D. Iida and H. Oshida, "Distortion-Suppressed Sampling Rate Enhancement in Phase-OTDR Vibration Sensing with Newly Designed FDM Pulse Sequence for Correctly Monitoring Various Waveforms," 2020 Optical Fiber Communications Conference and Exhibition (OFC), San Diego, CA, USA, 2020, pp. 1-3.

Non Patent Literature 6: Maria Rosario Fernandez-Ruiz, Hugo F. Martins, "Steady-Sensitivity Distributed Acoustic Sensors," J. Lightwave Technol. 36, 5690-5696 (2018)

Non Patent Literature 7: C. D. Butter and G. B. Hocker, "Fiber optics strain gauge," Appl. Opt. 17, 2867-2869 (1978)

Non Patent Literature 8: A. E. Alekseev et al., "Fidelity of the dual-pulse phase-OTDR response to spatially distributed external perturbation," Laser Phys. 29, 055106 (2019)

SUMMARY OF INVENTION

Technical Problem

The present disclosure aims to reduce crosstalk between different optical frequency components, and reduce erroneous detection of vibration and distortion of a vibrational waveform.

Solution to Problem

According to the present disclosure, the outer shape of light pulses to be injected the measurement target optical fiber is a waveform with small side lobes in the frequency domain. Thus, the degree of overlapping between the bands occupied by scattered light with the respective optical frequency components is lowered, and the problem of erroneous detection of vibration in a section withdrawn from the spot at which the vibration causing the crosstalk is actually generated is alleviated.

Specifically, in a frequency-multiplexed phase OTDR, a waveform, such as a raised cosine wave, having a smaller spectral side lobe than that of a rectangular wave is used as a pulse outer shape of each optical frequency component.

More specifically, a vibration measuring instrument and a vibration measuring method according to the present disclosure involves a measuring instrument that repeatedly injects a plurality of light pulses with different optical frequencies into an optical fiber, and performs DAS-P.

In this measuring instrument, light pulses having a waveform with a spectral side lobe smaller than a side lobe of a rectangular wave are used as the plurality of light pulses.

Advantageous Effects of Invention

According to the present disclosure, it is practicable to reduce crosstalk between different optical frequency components, and reduce erroneous detection of vibration and distortion of a vibrational waveform.

BRIEF DESCRIPTION OF DRAWINGS

FIG. 8 illustrates an example of light pulse generation using an SSB modulator.

DESCRIPTION OF EMBODIMENTS

Figure 1:
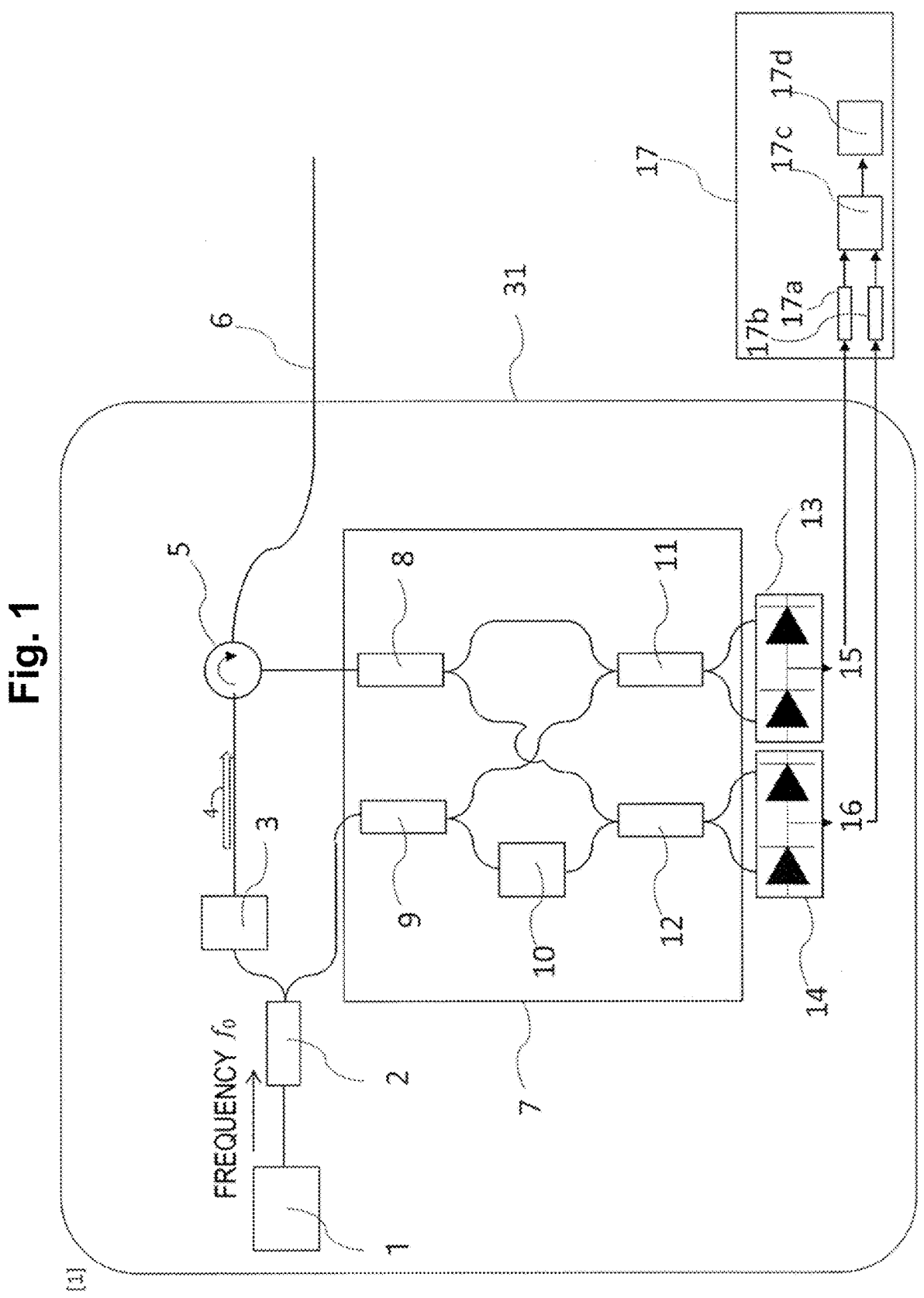
FIG. 1 is a diagram for explaining a vibration detection system that performs vibration detection by DAS-P according to this embodiment.

The following is a detailed description of an embodiment of the present disclosure, with reference to the drawings. Note that the present disclosure is not limited to the embodiment described below. These embodiment are merely an example, and the present disclosure can be carried out in forms with various modifications and improvements based on the knowledge of those skilled in the art. Note that components denoted by the same reference numeral in this specification and the drawings are the same as each other.

First Embodiment

FIG. 1 is a diagram for explaining a vibration detection system that performs vibration detection by DAS-P according to this embodiment. The vibration detection system includes: a light source that injects a frequency-multiplexed light pulse train into one end of the measurement target optical fiber; a light receiver that receives scattered light of each wavelength returned to the one end of the measurement target optical fiber; and a signal processing unit that observes vibration of the measurement target optical fiber as a temporal change in the phase component of the scattered light.

A vibration measuring instrument 31 includes a CW light source 1, a coupler 2, an optical modulator 3, a 90-degree optical hybrid 7, and balance detectors (13 and 14). A CW light source 1, a coupler 2, and an optical modulator 3 correspond to the light source. A 90-degree optical hybrid 7 and balance detectors (13 and 14) correspond to the light receiver. The light receiver performs coherent detection, using the 90-degree optical hybrid 7. A signal processing device 17 corresponds to the signal processing unit. However, it is not always necessary to use a 90-degree optical hybrid for the reception system, and some other device or signal processing may be used, as long as an in-phase component and a quadrature component of scattered light can be measured. The signal processing device 17 of the present disclosure can also be implemented in a computer and a program, and the program can be recorded on a recording medium or be provided through a network.

Figure 2:
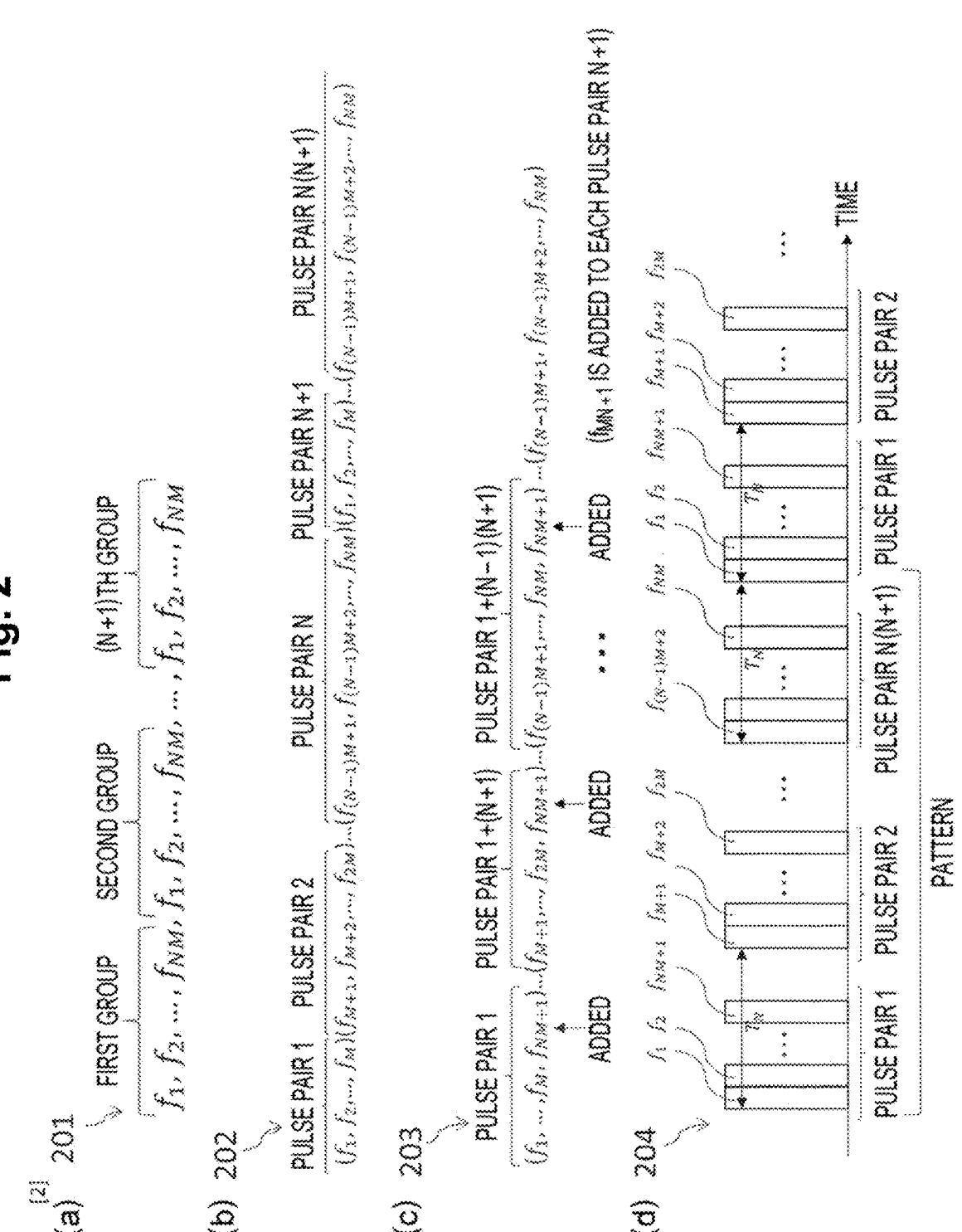
FIG. 2 illustrates an example configuration of a pulse pattern.

A vibration measuring instrument 31 measures scattered light from a measurement target optical fiber 6 as follows. Continuous light with a single wavelength that is an optical frequency $f_0$ is emitted from the CW light source 1, and is split into reference light and probe light by the coupler 2. The probe light is shaped into a wavelength-multiplexed light pulse 4 by the optical modulator 3. As the light pulse 4, a multiple pulse using a compensation optical frequency as disclosed in Non Patent Literature 5 can be used. An example configuration of the light pulse 4 is illustrated in FIG. 2.

N×M optical frequency components $f_1$ to $f_{NM}$ are to be used for the main pulse, and N+1 groups of them arranged in order are prepared. The whole sequence is divided by M (M being a natural number) as illustrated by 202, and N (N+1) pulse pairs are generated. A compensation optical frequency $f_{NM+1}$ is added to each of the N+1 pulse pairs in 202, to generate pulse pairs 203. The light pulse pair trains to be actually injected on the basis of the pulse pairs 203 are designed as illustrated in 204. As a result, a pulse pattern in which N (N+1) pulse pairs are arranged at constant time intervals is generated.

Here, the compensation optical frequency $f_{NM+1}$ is added to the pulse pairs having the pulse pair number 1+k (N+1) (k=0, 1, . . . , (N−1)). Accordingly, given N=3, and M=1, for example, the pulse pairs having optical frequencies $f_1$, $f_2$, and $f_3$ are repeatedly injected into the measurement target optical fiber 6. In this example, when k=0, a compensation optical frequency $f_4$ is added to the pulse pairs including the optical frequency $f_1$. When k=1, the optical frequency $f_4$ is added to the pulse pairs including the optical frequency $f_2$. When k=2, the optical frequency $f_4$ is added to the pulse pairs including the optical frequency $f_3$.

Given that the interval between pulse pairs is $T_N$, the limitation on the minimum value, as small as possible, of $T_N$ depending on the length of the measurement target optical fiber 6 is lowered to 1/N times of a limitation where a single optical frequency pulse is used. Also, in the configuration in FIG. 2, fading noise can be reduced with M pulses present in each pulse pair.

In FIG. 1, the kind of the optical modulator 3 is not specifically designated as long as the light pulse 4 can be generated, and may include a plurality of optical modulators.

For example, a single sideband (SSB) modulator, a frequency-variable acousto-optics (AO) modulator, or the like may be used, or intensity modulation may be further performed by a semiconductor optical amplifier (SOA) or the like to increase the extinction ratio in pulsing. Note that the pulses with the respective optical frequency components illustrated in 204 each have a rectangular waveform shape, but waveforms that are not rectangular can also be used.

The light pulse 4 is injected into the measurement target optical fiber 6 via a circulator 5. Light scattered at each point in the longitudinal direction of the measurement target optical fiber 6 returns to the circulator 5 as backscattered light, and is made to enter one input portion of the 90-degree optical hybrid 7. The reference light split by the coupler 2 is injected into the other input portion of the 90-degree optical hybrid 7.

The internal configuration of the 90-degree optical hybrid 7 may be any configuration that has the functions of a 90-degree optical hybrid. An example configuration is illustrated in FIG. 1. The backscattered light is injected into a coupler 8 having a branch ratio of 50:50, and the scattered light split into two light beams is injected into input portions of a coupler 12 having a branch ratio of 50:50 and a coupler 11 having a branch ratio of 50:50. The reference light is injected into a coupler 9 having a branch ratio of 50:50, and one light beam of the reference light, split into two light beams, is injected into an input portion of the coupler 11, and the other is injected into an input portion of the coupler 12 via phase shift of π/2 using a phase shifter 10.

The two outputs of the coupler 11 are detected by the balance detector 13, and an electrical signal 15 that is an analog in-phase component $I^{analog}$ is output. The two outputs of the coupler 12 are detected by the balance detector 14, and an electrical signal 16 that is an analog quadrature component $Q^{analog}$ is output.

The electrical signal 15 and the electrical signal 16 are sent to the signal processing device 17 that includes an analog-to-digital (AD) conversion element 17a and an AD conversion element 17b capable of sampling the frequency bands of signals without aliasing. In the signal processing device 17, the digitized signals of the in-phase component $I^{digital}$ and the quadrature component $Q^{digital}$ output from the AD conversion element 17a and the AD conversion element 17b are separated by a signal processing unit 17c into signals with the respective bands of optical frequencies $f_0+f_i$ (i=1, 2, . . . , NM+1) constituting the light pulse 4. As a specific signal processing method, any method may be used, as long as $I_i^{measure}$ (i=1, 2, . . . , NM+1) and $Q_i^{measure}$ (i=1, 2, . . . , NM+1), which are signals with the respective bands, can be accurately separated from $I^{digital}$ and $Q^{digital}$. For example, a calculation method for compensating for a phase delay by filtering $I^{digital}$ and $Q^{digital}$ through a bandpass filter whose center frequency is $f_0+f_i$ can be used. Given that the pulse width of each optical frequency component is represented by W, the passband can be set to 2/W. Alternatively, after the in-phase component and the quadrature component in an analog electrical signal state are separated into frequency components by an analog electrical filter, AD conversion may be performed by the AD conversion element 17a and the AD conversion element 17b.

A signal processing unit 17d performs phase calculation, on the basis of $I_i^{measure}$ and the $Q_i^{measure}$ acquired by the signal processing unit 17c. First, a complex vector $r_i$ is created on an x-y plane in which the in-phase component is represented by the x-axis (real number axis) and the quadrature component is represented by the y-axis (imaginary number axis).

[Math. 1-1]

$$r_i = (I_i^{measure}, Q_i^{measure}) \qquad (1\text{-}1)$$

The time at which the top of the pulse pair k is injected is expressed as $k \times T_N + n \times N \times T_N$ (n being an integer). Taking the optical frequency at the top of each pulse pair as a reference wavelength, the vectors, calculated in (1-1) in the bands of M different optical frequencies excluding the compensation optical frequencies constituting the pulse pairs, are averaged by the method disclosed in Patent Literature 1, and thus, the phase at the position at a distance z from the incidence end is calculated. The state of the measurement target optical fiber 6 at the position at the distance z from the incidence end in the longitudinal direction of the measurement target optical fiber 6 is measured at time $k \times T_N + n \times N \times T_N + z/v$ (n being an integer), with the propagation time of the light pulse being taken into consideration. Here, v represents the speed of light in the measurement target optical fiber 6. Further, with the time required for scattered light to propagate back to the incidence end being taken into consideration, the measurement time at the vibration measuring instrument 31 is expressed as $k \times T_N + n \times N \times T_N + 2z/v$ (n being an integer). The phase calculated at the point of the distance z is expressed as follows.

[Math. 1-2]

$$\theta_k\left(z, kT_N + nNT_N + \frac{2z}{v}\right) \qquad (1\text{-}2)$$

Here, the measurement time at the vibration measuring instrument 31 is explicitly expressed.

In this embodiment, the phase $\theta$ (z, $mT_N + 2z/v$) at the measurement time $mT_N + 2z/v$ (m being an integer) is calculated as shown below, using k and n, which satisfy $mT_N + 2z/v = KT_N + nNT_N + 2z/v$.

[Math. 1-3]

$$\theta\left(z, mT_N + \frac{2z}{v}\right) = \theta_k\left(kT_N + nNT_N + \frac{2z}{v}\right) \qquad (1\text{-}3)$$

The phase change, caused by vibration applied to the section from a distance $z_1$ to a distance $z_2$ on the measurement target optical fiber 6, is then calculated as the difference between Expression (1-3a) and Expression (1-3b), or as Expression (1-3c).

[Math. 1-3a]

$$\theta\left(z_2, mT_N + \frac{2z_2}{v}\right) \qquad (1\text{-}3a)$$

$$\theta\left(z_1, mT_N + \frac{2z_1}{v}\right) \qquad (1\text{-}3b)$$

$$\theta\left(z_2, mT_N + \frac{2z_2}{v}\right) - \theta\left(z_1, mT_N + \frac{2z_1}{v}\right) \qquad (1\text{-}3c)$$

Since the time at the moment of measurement of the state of the measurement target optical fiber 6 does not include the time required for scattered light to return to the incidence end as described above, the time at the point of the distance $z_1$ is $mT_N + z_1/v$, the time at the point of the distance $z_2$ is time $mT_N + z_2/V$, and there is a time difference $(z_1 - z_2)/v$ between these times. However, since the difference between the distances $z_1$ and $z_2$ is about the same as the spatial resolution and is usually set to several meters to several tens of meters, the time difference $(z_1 - z_2)/v$ is several tens to several hundreds of ns, which is very short with respect to the scale of temporal changes of the normal vibration to be measured. Accordingly, the difference in time at which the state of the measurement target optical fiber 6 is measured is negligible. Thus, the vibration applied to the corresponding section can be correctly measured.

However, $\theta$ (z, $mT_N + 2z/v$) includes a distortion term derived from an angular difference between the optical frequencies regarding the top of each pulse pair. Non Patent Literature 5 suggests a method for correcting the angular difference, using a compensation optical frequency. To completely correct the angular difference between different optical frequencies, it is necessary to correct the angular difference between the optical frequencies at the tops of two appropriate pulse pairs. When positive integers i and j satisfying i<j are selected as appropriate, the optical frequency at the top of the pulse pair j is represented by $f_j^{pf}$, and the optical frequency of the pulse pair i is represented by $f_i^{pf}$, the angular difference $\phi(z, f_j^{pf}, f_i^{pf})$ can be developed with $f_{NM+1}$ as shown below.

[Math. 1-4]

$$\varphi(z, f_j^{pf}, f_i^{pf}) = \varphi(z, f_j^{pf}, f_{NM+1}) + \varphi(z, f_{NM+1}, f_i^{pf}) \qquad (1\text{-}4)$$

Here, i and j are positive integers, and satisfy i<j.

In the pulse pair 203 optical frequency combination that is used as an example, the optical frequency $F_{NM+1}$ is added to the pulse pairs with the pulse pair numbers $1+k$ (N+1) (k=0, 1, . . . (N−1)). Accordingly, a pulse pair where the optical frequency $f_{NM+1}$ exists and a pulse pair where different optical frequency or frequencies exist always become the same once within the period $N(N+1)T_N$. For example, given N=3, and M=1, the number of pulse pairs constituting the pulse pattern is 12. In this example, the first pulse pair includes the optical frequency $f_1$ and the optical frequency $f_4$, the fifth pulse pair includes the optical frequency $f_2$ and the optical frequency $f_4$, and the ninth pulse pair includes the optical frequency $f_3$ and the optical frequency $f_4$. Accordingly, in the pulse pattern, a pulse pair where the optical frequency $f_4$ exists and a pulse pair where one of the other frequencies $f_1$, $f_2$, and $f_3$ exists always become the same once. Thus, each term on the right-hand side of Expression (1-4) can be calculated by the same principle as the method disclosed in Patent Literature 1. With the use of the obtained value of $\phi(f_j^{pf}, f_i^{pf})$, the eventual phase is calculated from $\theta$ (z, $mT_N + 2z/v$).

Figure 3:
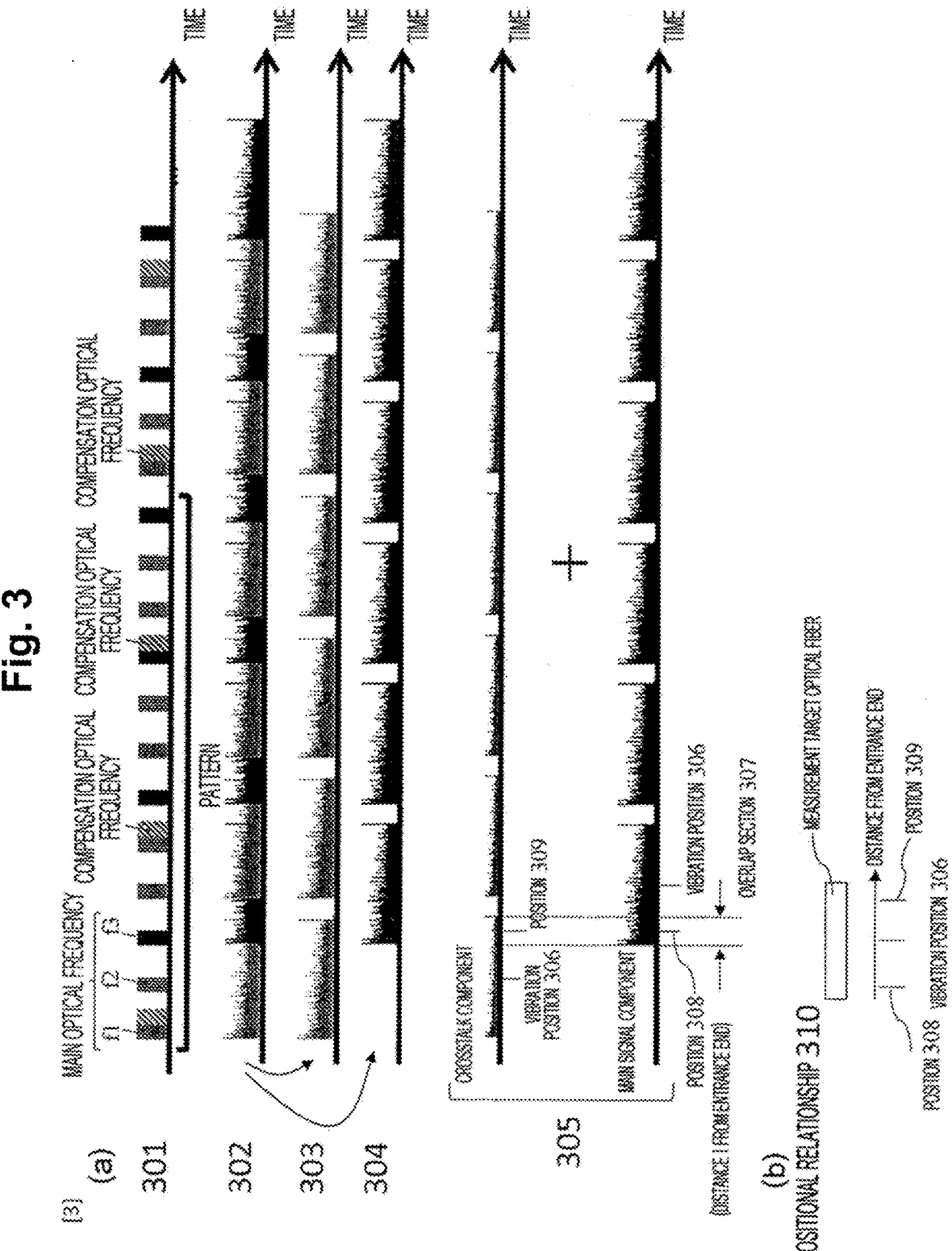
FIG. 3 illustrates an example of crosstalk occurring in a state where a pulse outer shape of each optical frequency component is a rectangular waveform.
Figure 4:
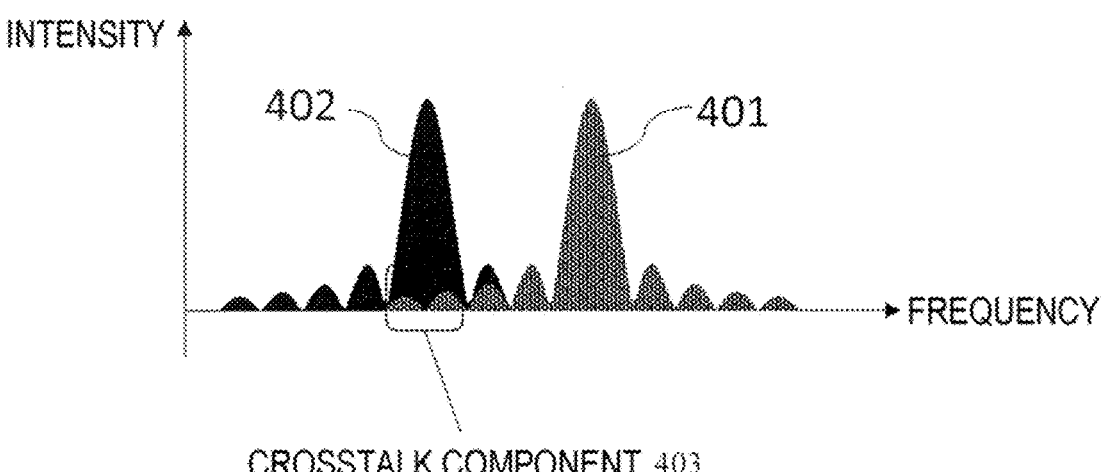
FIG. 4 illustrates an example of side lobes included in scattered light signals.

First, the problem in that a vibration position cannot be identified as described in Non Patent Literature 5 in an example where the pulse outer shape of each optical frequency component is a rectangular waveform as indicated by 204 in FIG. 2 is described. For the sake of simplicity, a case where M is 1 is described herein, but the same applies in an example where M is an appropriate number. The pulse train in the case where M is 1 is shown as 301 in FIG. 3. As for scattered light, only $f_1$ and $f_3$ are shown in 302, for ease of explanation. The main signal components can be separated into 303 and 304 by signal processing. However, side lobes are present in the occupied band of a scattered light signal as illustrated in FIG. 4. Therefore, even though the main lobe in the occupied band 401 of the optical frequency $f_1$ and the occupied band 402 of the optical frequency $f_3$ can be separated from each other, the side lobes of the scattered light generated by the light pulse of the optical frequency $f_1$ component cause crosstalk 403 into the main lobe of the scattered light generated by the light pulse of the optical frequency $f_3$. Since the crosstalk 403 is present, the signal actually separated as the optical frequency component $f_3$ is formed with an overlap between the crosstalk component and the main signal component as shown in 305 in FIG. 3, and these components cannot be separated from each other.

Figure 5:
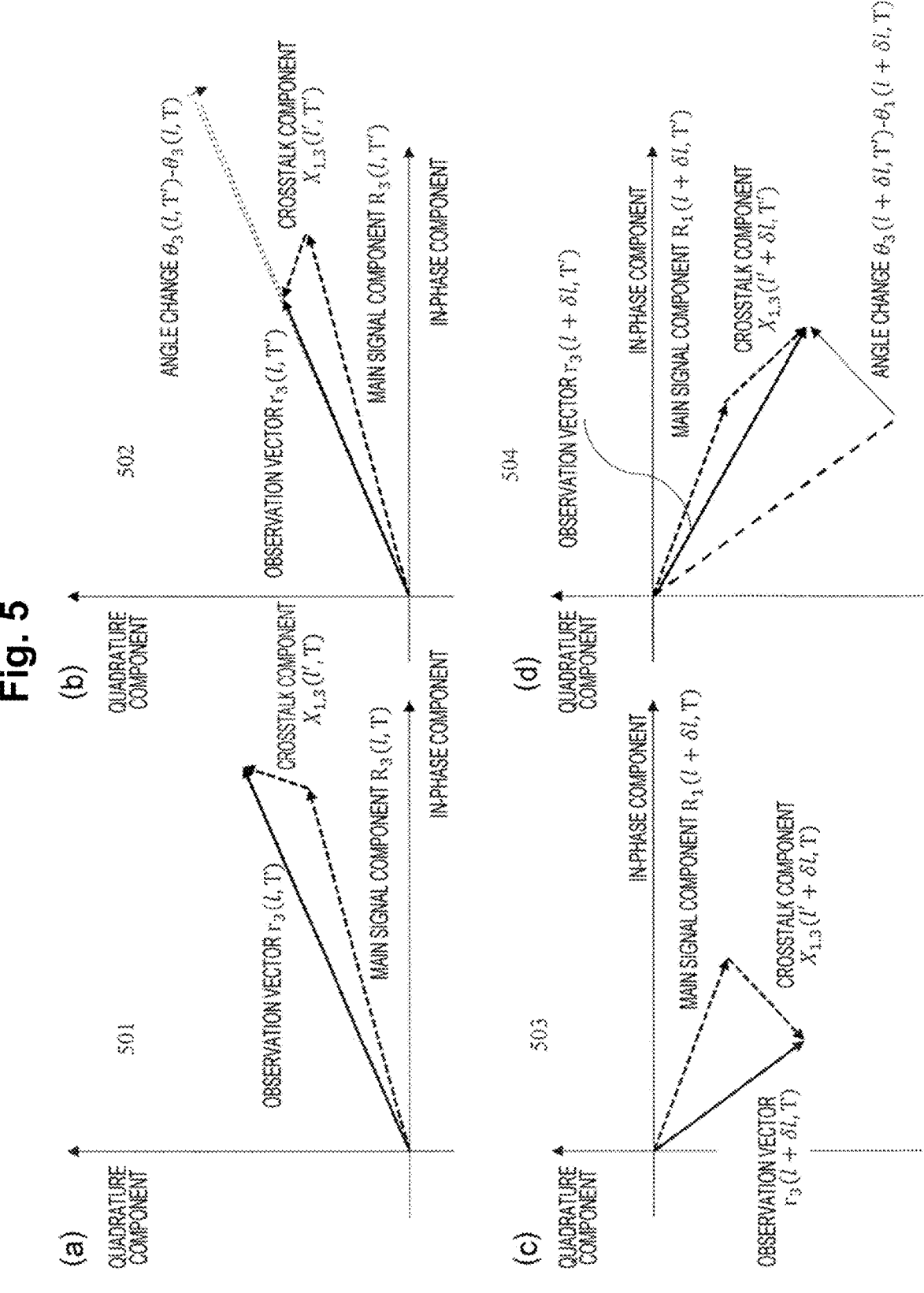
FIG. 5 illustrates an example of main signal components and crosstalk components.

An example where vibration occurs at a vibration position 306 is now described. A section in which a crosstalk component overlaps with a front portion of a main signal component is set as an overlap section 307, and a phase is calculated at a position 308 in the section 307. The distance from the incidence end of the position 308 is represented by 1. As illustrated in FIG. 5, the main signal component and the crosstalk component are combined in a vector state in a plane in which the abscissa axis represents the in-phase component and the ordinate axis represents the quadrature component, and form observation vectors. That is, given that the observation vector at the distance 1 at time T is represented by $r_3$ (1, T), the vector of the main signal component is represented by $R_3$ (1, T), and the vector of the crosstalk component is represented by $X_{1,3}$ (1, T), the following expression is satisfied.

[Math. 1-5]

$$r_3(l, T) = R_3(l, T) + X_{1,3}(l', T) \tag{1-5}$$

It should be noted that, in Expression (1-5), the value of the distance from the incidence end of the crosstalk component is represented by 1', which differs from 1. This is because the crosstalk component and the main signal component are received at different timings, and accordingly, with the vector corresponding to the position 308 of the main signal component, the vector corresponding to the different position 309 of the crosstalk component overlaps. As illustrated in a positional relationship 310 in the fiber in FIG. 3, the position 308 is located before the vibration position 306, while the position 309 is located behind the vibration position 306. As illustrated in FIG. 5, with the change from a state 501 at time T to a state 502 at time T' being taken into consideration, the vector of the main signal component does not change, since the position 308 is a point located before the vibration position 306. Meanwhile, since the position 309 is located behind the vibration position 306, a change is caused in the angle of the crosstalk component by vibration. As a result, the observation vector also changes in angle. Given that the angle of the observation vector $r_3$ (1, T) is represented by $\theta_3$ (1, T), for example, the amount of change in the angle is expressed by Expression (1-6).

[Math. 1-6]

$$\theta_3(l, T') - \theta_3(l, T) \tag{1-6}$$

The amount of change expressed by Expression (1-6) depends not only on the magnitude of the vibration generated at the vibration position 306 but also on the lengths of the vector of the main signal component and the vector of the crosstalk component and on the angular difference between the two vectors. Since the length and the angle of a vector change from position to position due to a fading effect, the amount of change in the angle shown in Expression (1-6) changes in response to the distance 1. For example, the same applies to the angle change at a position that is behind the position 308 by ol, as long as the position is within the overlap section 307.

In a situation where the length and the angle of a vector change as in a state 503 and a state 504, even though the rotation angle of the crosstalk component is the same at the distances 1' and 1'+δl from the incidence end, the angle change $\theta_3(l+\delta l, T') - \theta_1(l+\delta l, T)$ as an observation vector is different from the angle change at the distance 1. Therefore, as in Expression (1) in Background Art, with the phase change in the section at the distance 1 to the distance 1+δl from the incidence end being taken into consideration, vibration is detected at a time when sampling is performed at the optical frequency $f_3$, even though the time does not correspond to a vibration spot. Although crosstalk of the optical frequency $f_1$ into the optical frequency $f_3$ is taken into consideration in the above example, crosstalk by some other optical frequency also exists. Also, the above example has clarified that vibration is observed at a spot other than the actual vibration spot with respect to the time of sampling at the optical frequency $f_3$ due to the influence of crosstalk of another optical frequency into the optical frequency $f_3$. However, the same holds true for the time of sampling at another optical frequency. Further, although an example where M is 1 has been described, the same argument holds true in an example where M is another appropriate number.

Therefore, in a frequency multiplexing technique for improving a sampling rate, vibration is often observed at a spot that is not a vibration spot. The influence of this is conspicuous particularly in a situation where the use of pulses of short durations to increase the spatial resolution widen the band occupied by each optical frequency component in the frequency domain, a state where it is necessary to multiplex a very large number of optical frequency components in a limited frequency band, and the like. Also, in the above example, the problem of vibration, resulting from crosstalk, being observed at a spot that is not a vibration spot has been mentioned. However, the main signal component and the crosstalk component are combined in a vector state in a plane in which the abscissa axis represents the in-phase component and the ordinate axis represents the quadrature component, and form observation vectors. In view of this, it is apparent that a phenomenon in which the vibrational waveform at a vibration spot is distorted compared with the actual waveform occurs, and complete correction of the angular difference using a compensation optical frequency cannot be performed.

This embodiment suggests a method for solving the problem of the crosstalk by the pulse shape of each optical frequency component having an outer shape that changes smoothly. The temporal waveform of each optical frequency pulse that is used in this suggestion is illustrated in 610 in FIG. 6. The outline of the envelope of an electrical field before multiplication by the carrier frequency is shown. A waveform 601 is a conventional rectangular wave shape that is also used in Non Patent Literature 5, and a waveform 602 indicates a waveform shape that is used in the present disclosure. Waveform shapes are not limited to a specific shape, as long as crosstalk can be prevented. For example, a raised cosine waveform can be used. The waveform 602 is illustrated as a raised cosine waveform, for example. The full width at half maximum 603 of the pulse is made the same as that of a rectangular wave, so that the spatial resolution of the vibration measurement device can be kept constant, and degradation of the SN ratio of a signal can also be prevented. The power density in the frequency domain is shown in 620. In contrast to 604 of a rectangular wave, in the raised cosine waveform illustrated in 605, it can be seen the side lobes are reduced, and the magnitude of the crosstalk can be made smaller. Accordingly, the pulse train where the raised cosine waveform is used has an outer shape 701 illustrated in FIG. 7. With the use of the pulse train illustrated in 701, the vector length with the crosstalk component can be shortened. Accordingly, even without changing the signal processing method or the like designed for phase calculation, it is practicable to alleviate the problem of vibration, resulting from crosstalk, being observed at a spot other than the vibration spot, the occurrence of a phenomenon that the vibrational waveform at the vibration spot is distorted compared with the actual waveform, and the influence that hinders complete correction of the angular difference using a compensation optical frequency.

Figure 8:
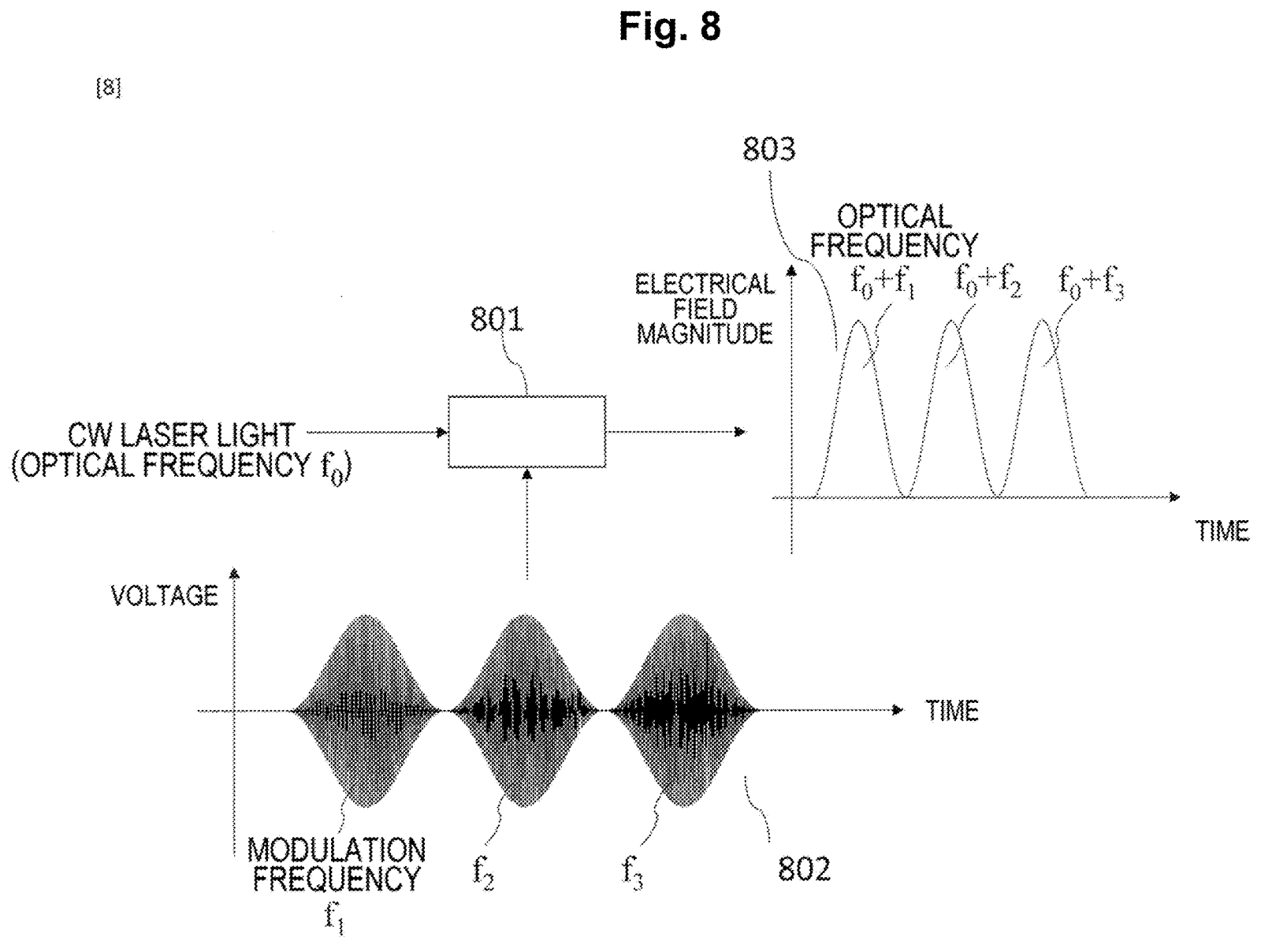

An example of a light pulse generation method using an SSB modulator is now described with reference to FIG. 8. This is an example in which a modulation signal 802 is given to an SSB modulator 801 to modulate continuous light and create a light pulse pair 803. When the modulation signal 802 to be given is designed so that the envelope of each modulation frequency component has an outer shape of a raised cosine waveform, the magnitude of the electrical field of each optical frequency component can also have an outer shape that changes smoothly.

Considering that modulation frequencies of the modulation signal 802 are in a sequence of $f_1$, $f_2$, and $f_3$, for example, and the frequency of the original continuous light is $f_0$, the generated pulse pair 803 can be regarded approximately as a pulse pair in which optical frequencies are in a sequence of $f_0+f_1$, $f_0+f_2$, and $f_0+f_3$. When the scattered light generated by injecting the pulse pair is coherently detected and is subjected to signal processing, the center frequencies of bandpass filters for extracting the respective optical frequency components in the signal processing unit 17c are only required to be set as $f_1$, $f_2$, and $f_3$.

The measurement resolution can also be set on the assumption that the full width at half maximum (FWHM) of the raised cosine waveform, which is the envelope of each modulation frequency component of the modulation signal 802, approximately matches the FWHM of each optical frequency component of the magnitude of the electrical field of the pulse pair 803. For example, the passband width of a bandpass filter in the signal processing unit 17c is determined by the FWHM of the raised cosine waveform. However, the resolution can also be determined through adjustment of the FWHM of the raised cosine waveform, with the characteristics of an SSB being taken into consideration.

Figure 6:
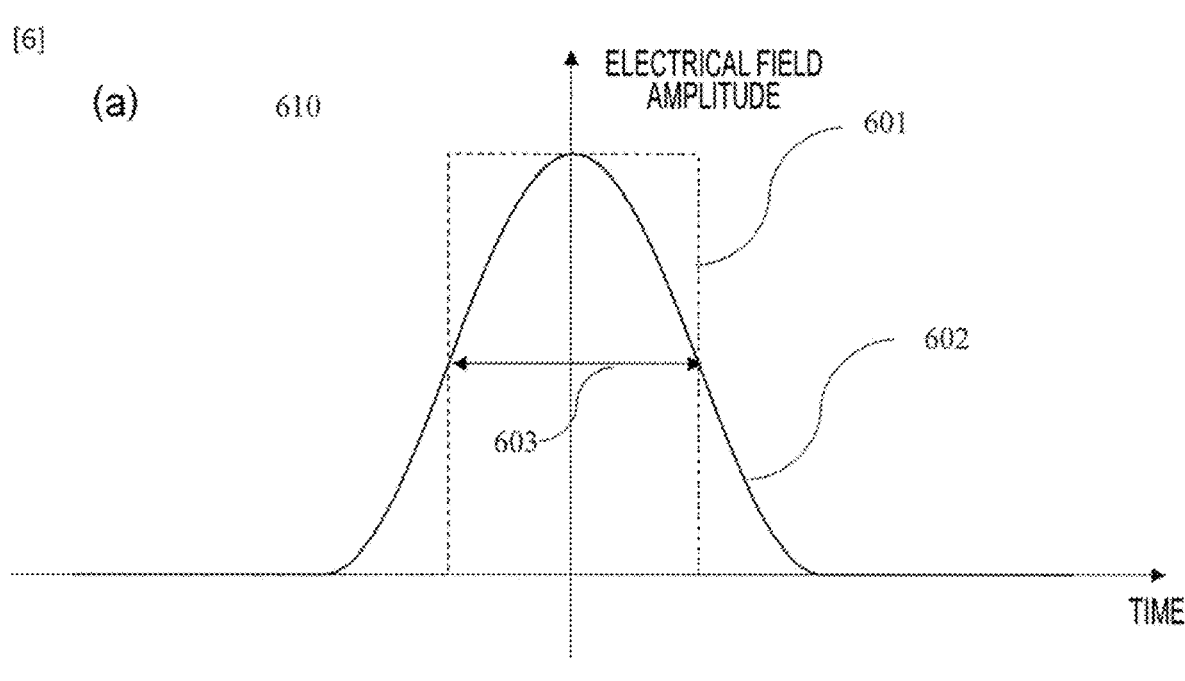
FIG. 6 illustrates an example of the temporal waveform of each optical frequency pulse according to the present disclosure.
Figure 6:
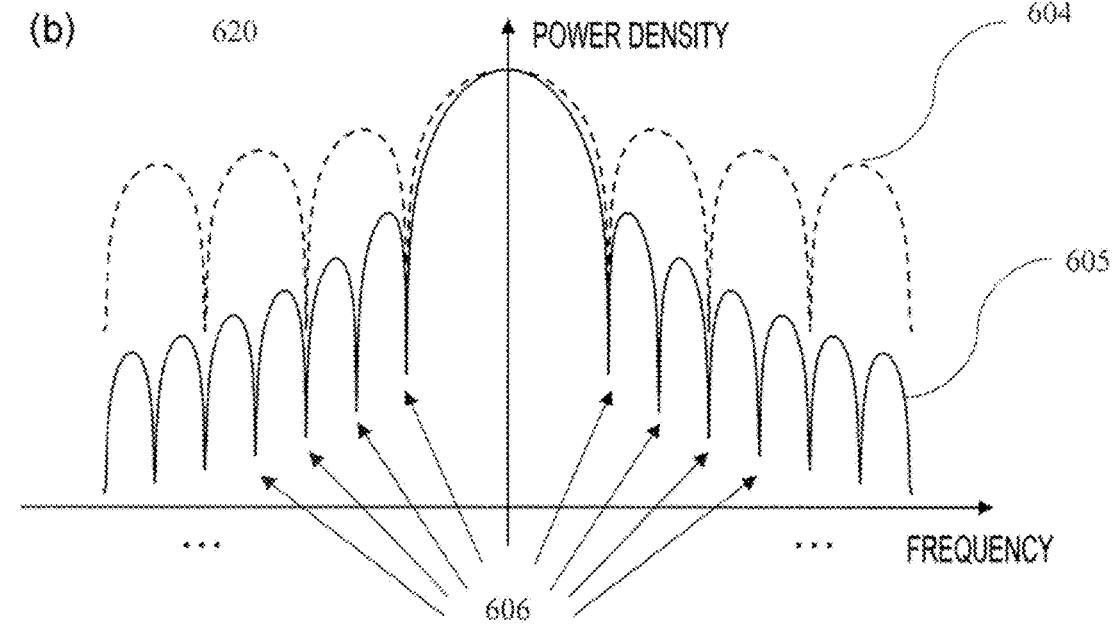
Figure 7:
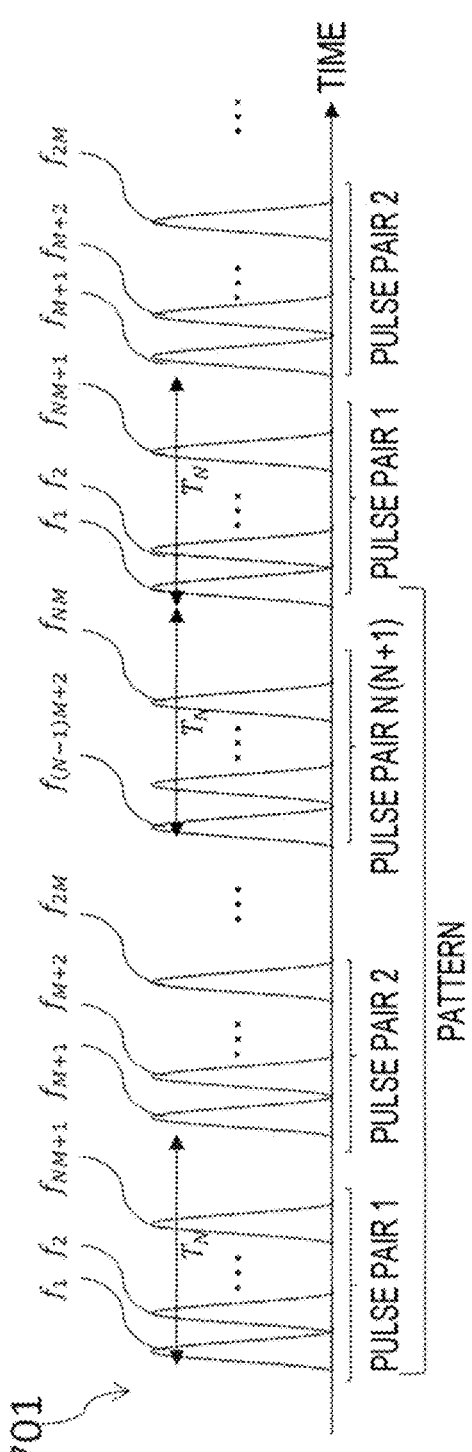
FIG. 7 illustrates an example of a pulse train that is used in the present disclosure.

Note that, as for the selection of each of the main optical frequencies in frequency multiplexing, the selection is performed so that the center of the main lobe of the main optical frequency included in one of the pulse pairs is located at the position of the valley of the side lobe of each main optical frequency included in another illustrated in 606 in FIG. 6. Thus, the influence of crosstalk resulting from the side lobes can be made smaller.

Note that light pulse pairs that can be used in the present disclosure are not limited to those having the configuration illustrated in FIG. 2, but can be used for all techniques for improving a sampling rate through frequency multiplexing.

Advantageous Effects of the Disclosure

According to the present disclosure, in an optical frequency-multiplexed phase OTDR that injects different optical frequency components at different times as disclosed in Non Patent Literature 5, a waveform having small spectral side lobes such as a raised cosine waveform, instead of a conventional rectangular wave, is used as the pulse outer shape of each optical frequency component. Thus, crosstalk between different optical frequency components is reduced, erroneous detection of vibration at spots other than the vibration spot is prevented, the occurrence of a phenomenon in which the vibrational waveform at the vibration spot is distorted compared with the actual vibrational waveform is reduced, and the influence that hinders complete correction of the angular difference using a compensation optical frequency is made smaller.

INDUSTRIAL APPLICABILITY

The present disclosure can be applied to information and communication industries.

REFERENCE SIGNS LIST

1 CW light source
2 coupler
3 optical modulator
4 light pulse
5 circulator
6 measurement target optical fiber
7 90-degree optical hybrid
8, 9 coupler
10 phase shifter
11, 12 coupler
13, 14 balance detector
15 analog in-phase component electrical signal
16 analog quadrature component electrical signal
17 signal processing device
17a, 17b AD conversion element
17c, 17d signal processing unit
31 vibration measuring instrument

The invention claimed is:

1. A vibration measuring instrument, comprising:
   a light source interfaced with an optical modulator, where the light source and the optical modulator cooperatively operate to repeatedly inject a plurality of light pulses with different optical frequencies into an optical fiber,
   a light receiver configured to receive scattered light; and
   a signal processing device interfaced with the light receiver and performs distributed acoustic sensing-phase (DAS-P), wherein light pulses having a waveform with a spectral side lobe smaller than a side lobe of a rectangular wave are used as the plurality of light pulses.

2. The vibration measuring instrument according to claim 1, wherein
   the plurality of light pulses includes a plurality of pulse pairs including a component of a main optical frequency and a component of a compensation optical frequency, and
   a center of a main lobe of a main optical frequency included in one of the pulse pairs is set at a frequency position located at a valley of a side lobe component of a main optical frequency included in another.

3. The vibration measuring instrument according to claim 1, comprising a single sideband modulator that generates the plurality of light pulses by modulating continuous light using a modulation signal.

4. The vibration measuring instrument according to claim 3, wherein an envelope of each modulation frequency component of the modulation signal has a raised cosine waveform.

5. The vibration measuring instrument according to claim 3, wherein a modulation frequency component of the modulation signal is used, to separate, for each of the plurality of light pulses, scattered light generated from the plurality of light pulses scattered by the optical fiber.

6. The vibration measuring instrument according to any one of claims 3, wherein a passband width in a bandpass filter for separation for each of the plurality of light pulses is determined by a full width at half maximum (FWHM) of a raised cosine waveform.

7. A vibration measuring method, comprising:

repeatedly injecting a plurality of light pulses with different optical frequencies into an optical fiber using a light source of a vibration measurement instrument, and performing, using a signal processing device of the vibration measurement instrument, distributed acoustic sensing-phase (DAS-P), wherein the plurality of light pulses are configured with a waveform having a spectral side lobe smaller than a side lobe of a rectangular wave.

\* \* \* \* \*